United States Patent [19]
Lamb et al.

[11] 4,455,159
[45] Jun. 19, 1984

[54] METHOD OF AND APPARATUS FOR COATING OPTICAL FIBER WITH PLASTICS MATERIAL

[75] Inventors: John G. Lamb, Harlow; Malcolm D. Mackay, Old Harlow, both of England

[73] Assignee: International Standard Electric Corporation, New York, N.Y.

[21] Appl. No.: 413,860

[22] Filed: Sep. 1, 1982

[51] Int. Cl.³ .............................................. C03C 25/02
[52] U.S. Cl. ...................................... 65/3.11; 65/3.43; 65/11.1; 118/234; 427/44; 427/163
[58] Field of Search ...................... 65/3.11, 3.43, 11.1; 427/44, 54.1, 163; 118/68, 234

[56] References Cited

U.S. PATENT DOCUMENTS

| | | | |
|---|---|---|---|
| 3,681,039 | 8/1972 | Marzocchi | 65/3.1 |
| 4,324,575 | 4/1982 | Levy | 65/3.43 X |
| 4,388,093 | 6/1983 | Kimura et al. | 65/3.43 X |

OTHER PUBLICATIONS

Electronics Letters, vol. 18, No. 16, pp. 713–715, Chida et al., Aug. 5, 1982.

*Primary Examiner*—Robert L. Lindsay, Jr.
*Attorney, Agent, or Firm*—John T. O'Halloran; Peter R. Ruzek

[57] ABSTRACT

The rate at which glass optical fiber can satisfactorily be coated with a primary plastics coating by a liquid application method is enhanced by causing the fiber to enter the liquid contained in a coating vessel via a suction tube in which a partial vacuum is maintained by an air induction device. Optionally a funnel is used to deflect the exhaust away from the incoming uncoated fiber.

13 Claims, 2 Drawing Figures

4,455,159

METHOD OF AND APPARATUS FOR COATING OPTICAL FIBER WITH PLASTICS MATERIAL

BACKGROUND OF THE INVENTION

The present invention relates to the provision of a plastics material coating on an optical fiber in general, and more particularly to a method of and apparatus for providing such coating at a high advancement speed on a glass optical fiber.

In the manufacture of glass optical fibers, it is desirable to provide the freshly drawn fiber with a plastics material protective coating as soon as conveniently possible after drawing in order to limit the reduction of strength consequent upon damage to the pristine surface of the optical fiber occasioned by atmospheric attack. This coating is conventionally applied by passing the fiber downwardly through a bath containing a suitable liquid, typically a resin solution or prepolymer. The fiber leaves the bath with a liquid coating which is then cured to form a plastics protective sheath for the fiber. If the fiber is passed too quickly through the coating bath, there arises an increasing tendency for incomplete wetting of the fiber and formation of bubbles in the coating, or more usually for lengths of fiber to emerge entirely unwetted and completely devoid of coating. One approach to ameliorating this problem, which is described in United Kingdom Patent Specification No. 1,441,086, involves placing ballotini in the coating bath to strip bubbles from the fiber. A disadvantage of this approach is the risk of damage to the fiber by the bubble-stripping action of the ballotini.

SUMMARY OF THE INVENTION

Accordingly, it is a general object of the present invention to avoid the disadvantages of the prior art.

More particularly, it is an object of the present invention to develop a method of coating optical fibers with plastics materials, which method does not possess the disadvantages of the conventional optical fiber coating methods.

Still another object of the present invention is to provide an optical fiber coating method which assures the formation of a continuous and bubble-free plastics material coating on the optical fiber.

A concomitant object of the present invention is to devise an apparatus which is especially suited for performing the method of the present invention.

It is yet another object of the present invention to so construct the apparatus of the type here under consideration as to be simple in construction, inexpensive to manufacture, easy to use, and reliable in operation nevertheless.

In pursuance of these objects and others which will become apparent hereafter, one feature of the present invention resides in a method of applying a plastics coating to a glass optical fiber wherein the uncoated fiber is drawn downwardly through an aperture in the base of a vessel containing a plastics precursor in liquid form, wherein the freshly prepared fiber enters, without previous contact with any other surface, the plastics precursor liquid in a region of reduced pressure produced by the action of an air induction device creating a partial vacuum in an open ended tube that surrounds the fiber and dips into the liquid in the vessel, and wherein the liquid coating on the fiber issuing from the vessel aperture is subsequently cured to form the plastics coating.

According to another concept of the invention, there is provided an apparatus for applying a plastics coating to a glass optical fiber, which apparatus includes a coating station located above a curing station and means for drawing the optical fiber through the two stations, wherein the coating station includes a coating vessel for containing a plastics precursor in a liquid form, which vessel is provided with an aperture in its base through which the fiber can freely pass, wherein above the aperture and located in alignment therewith there is an open ended tube whose lower end protrudes into the vessel and whose upper end is connected with an air induction device adapted to create a partial vacuum in the tube, and wherein the curing station is provided with means for curing the liquid coating on fiber issuing from the vessel aperture to transform it into a plastics coating.

BRIEF DESCRIPTION OF THE DRAWING

Above-mentioned and other features and objects of this invention will become more apparent by reference to the following description taken in conjunction with the accompanying drawing, in which.

DETAILED DESCRIPTION OF THE PREFERRED EMBODIMENT

Figure 1:
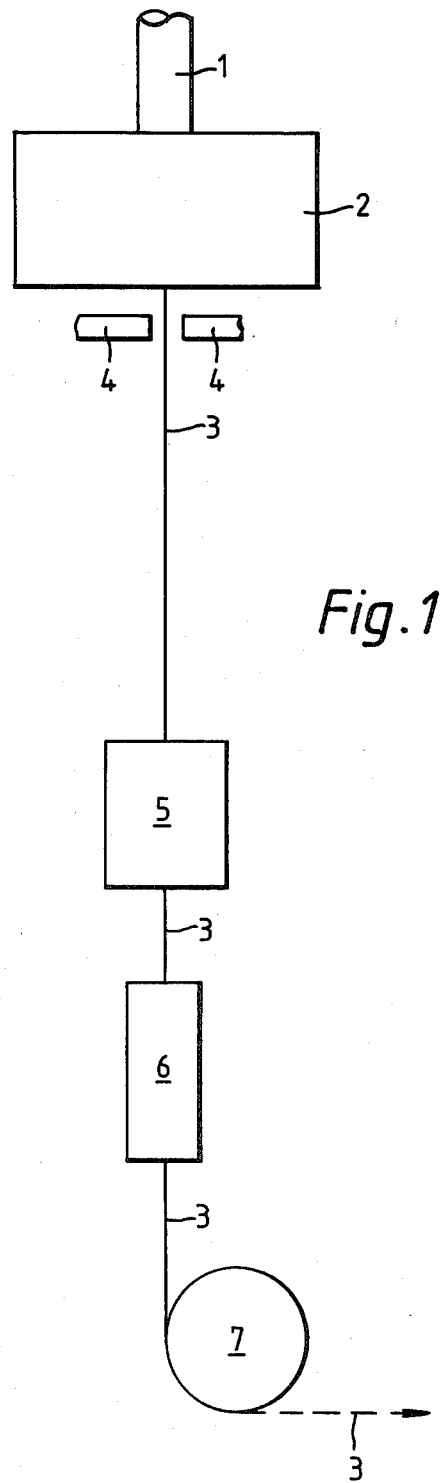
FIG. 1 is a diagrammatic view depicting the general layout of components of an apparatus according to the present invention used in processing a silica optical fiber preform rod into plastics primary coated fiber.

Referring now to the drawing in detail, and first to FIG. 1 thereof, it may be seen that the reference numeral 1 has been used to identify a silica optical fiber preform. The preform 1 is progressively lowered, lower end first, at a controlled rate into a furnace 2 where it is softened by the heat so that a fiber 3 can be drawn from its tip. This fiber 3 passes through a monitoring station 4 at which its diameter is monitored to provide a feedback signal to operate a control loop regulating the rate at which the preform 1 is lowered into the furnace 2 so as to maintain a constant fiber diameter. The fiber 3 next passes through a coating station 5 where it is coated with a liquid resin to protect it from degradation by atmospheric attack. Beneath the coating station 5 is a curing station 6 where the liquid resin is cured, typically by heat or by ultra-violet light depending upon resin type. The fiber 3 complete with its plastics coating is then reeled up on a drum 7, or alternatively directed elsewhere, such as for further processing, either by a pulley or some form of traction device such as a capstan or caterpillar drive.

One of the factors governing the rate at which the fiber 3 can be coated is the distance between the furnace and the coating station. It is believed that it is the temperature of the fiber 3 as it enters the resin that is responsible. Thus when silica fiber approximately 125 microns in diameter is drawn through a coating station containing a polysiloxane resin, marketed under the designation Sylgard 182, in an open vessel to a depth of between 2 and 10 cm, it is found that the fiber can be satisfactorily coated at a rate of up to about 60 meters per minute in a drawing rig providing approximately 1.5 meters between the bottom of the furnace and the surface of the resin in the curing station; whereas in a smaller rig where the corresponding separation is approximately 0.5 meters, the safe coating top speed limit is in the region of 30 meters per minute.

Figure 2:
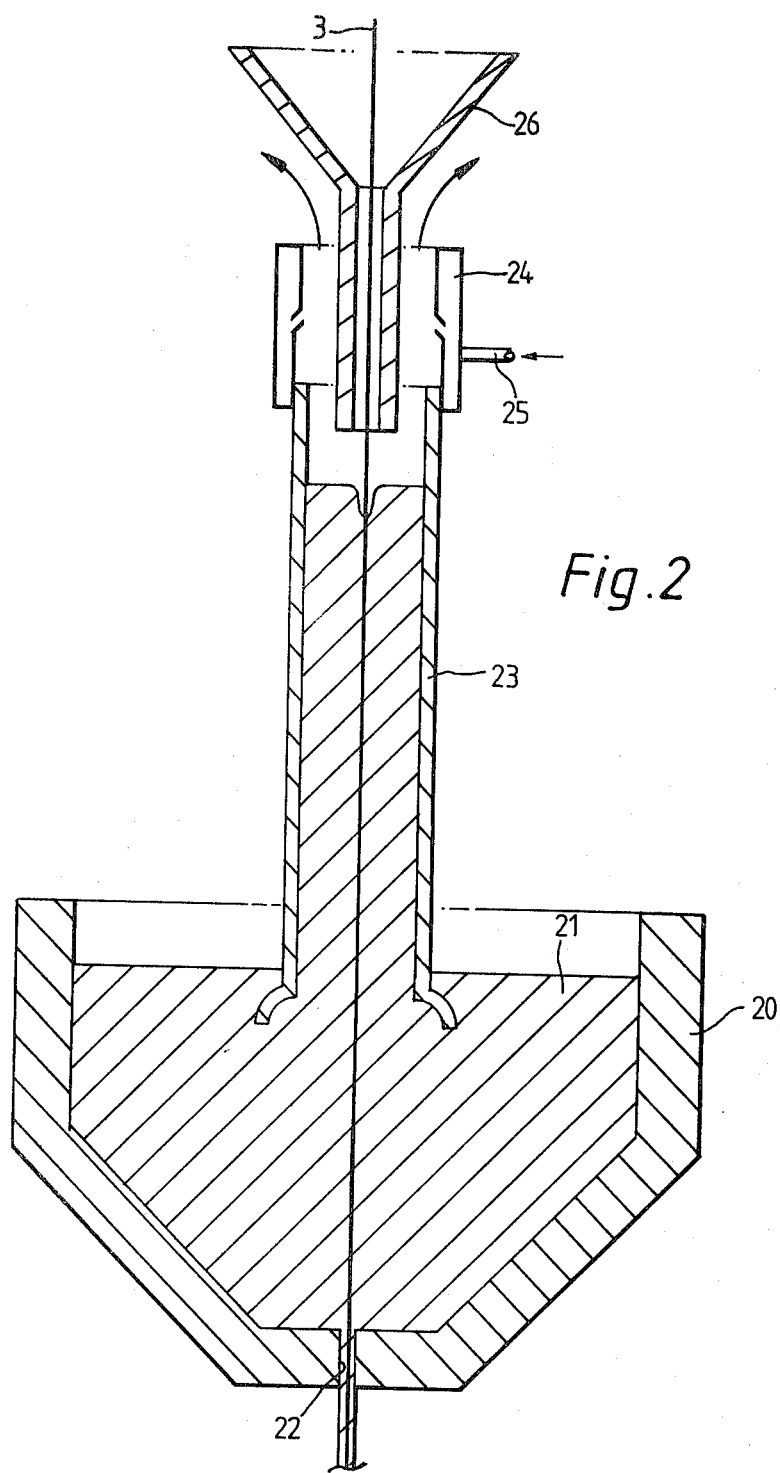
FIG. 2 is a somewhat simplified sectional view of a coating unit of FIG. 1.

Turning now to FIG. 2, it may be seen that the coating station 5 has a vessel 20 containing a body 21 of a coating resin constituting a plastics precursor. At the bottom of this vessel 20, which may be water cooled to inhibit premature curing of the resin, there is provided an orifice 22 through which the fiber 3 passes. Although not shown in FIG. 2, it is convenient to provide this orifice on the line of abutment of two shutters which can be moved apart to facilitate threading of the fiber 3 through the vessel 20 before it is filled.

Dipping into the resin body 21 is a suction tube 23 approximately 25 cm long and 5 cm in bore diameter. At its upper end, this suction tube 23 is connected to an air induction device 24, marketed by F. Brauer Limited, Harpenden, Herts. under the designation 'Airmover'. The device 24 uses a flow of compressed air into a pipe 25 to create a partial vacuum in the tube 23. Optionally, in order to keep the air flow from the air induction device 24 away from the fiber 3, the fiber 3 is threaded through a funnel 26, the outside of whose conical region serves as a deflector while its stem extends just through the device 24 and preferably into the upper end of the tube 23.

By admitting sufficient compressed air into the air induction device 24 to raise the height of the resin within the suction tube 23 about 10 cm above its height outside the tube 23, it has been found possible to increase the coating speed in the larger rig referred to previously substantially above the region of 60 meters per minute.

If the compressed air supply is shut off, the level of resin in the suction tube 23 begins to fall, but, long before it has fallen to any appreciable extent, the resin ceases properly to wet the moving fiber 3. This shows that the increased coating speed is not attributable merely to the increased length of column of resin in contact with the fiber 3.

A particular advantage of the invention in comparison with the method described in United Kingdom Patent Application 2 048 726A is that the reduced pressure at the point of entry of the fiber 3 into the plastics precursor is maintained without recourse to vacuum seals or adjustable end diaphragms. In this way the risk of damage to the fiber 3 by contact with such seals or diaphragms is avoided.

While we have discussed above the principles of our invention in connection with specific apparatus, it is to be clearly understood that this description is made only by way of example and not as a limitation to the scope of our invention as set forth in the accompanying claims.

We claim:

1. A method of providing an optical fiber with a coating of plastics material, comprising the steps of
   advancing the optical fiber longitudinally thereof and downwardly into a body of a liquid precursor of the plastics material;
   subjecting a region of the upper surface of the body around the point of entry of the optical fiber into the body to a pressure reduced below that applied to the remainder of the upper surface of the body;
   withdrawing the optical fiber with a layer of the plastics material precursor thereon from the body; and
   effecting curing of the material precursor of the layer into the plastics material.

2. The method as defined in claim 1, wherein said withdrawing step includes passing the optical fiber downwardly through an aperture situated below the upper level of the body.

3. The method as defined in claim 2, wherein said advancing and withdrawing steps include pulling the optical fiber downwardly through the body.

4. the method as defined in claim 3 for use on a glass optical fiber, wherein said pulling step includes drawing the glass optical fiber from a glass optical preform.

5. The method as defined in claim 4, wherein said subjecting step is performed at a location so spaced from the optical preform that the surface of the optical fiber is still pristine.

6. The method as defined in claim 4, wherein said pulling step is so performed as to keep the optical fiber out of contact with any other surface prior to the contact thereof with the body.

7. The method as defined in claim 1, wherein said subjecting step includes forming an enclosed confining space around the region to be subjected to the reduced pressure, and causing a gaseous medium to flow past the confining space in such a direction and at such a speed as to induce the reduced pressure in the confining space; and further comprising the step of deflecting the flow of the gaseous medium from the still uncoated optical fiber.

8. An apparatus for providing an optical fiber with a coating of plastics material, comprising
   means for containing a body of a liquid precursor of the plastics material;
   means for advancing the optical fiber longitudinally thereof and downwardly into, and for withdrawing the optical fiber with a layer of the plastic material precursor from, the body;
   means for subjecting a region of the upper surface of said body around the point of entry of the optical fiber into said body to a pressure reduced below that applied to the remainder of said upper surface; and
   means for curing the plastics material precursor of said layer into the plastics material.

9. The apparatus as defined in claim 8, wherein said containing means includes a vessel having a bottom wall with an aperture wherein said advancing and withdrawing means includes means for pulling the optical fiber downwardly through said aperture; and wherein said subjecting means includes an open-ended tube extending along the optical fiber and around said region from above to below said upper level of said body, and means for inducing partial vacuum in the interior of said tube.

10. The apparatus as defined in claim 9, wherein said inducing means includes means for causing a gaseous medium to flow in such a direction and at such a speed at the upper end of said tube as to partially evacuate the interior of said tube.

11. The apparatus as defined in claim 10, and further comprising means for deflecting the flow of the gaseous medium from the still uncoated optical fiber.

12. The apparatus as defined in claim 11, wherein said deflecting means includes a funnel diverging in the upward direction and surrounding the optical fiber at and upwardly of the region of operation of said inducing means.

13. The apparatus as defined in claim 9, wherein said pulling means includes means for drawing the optical fiber from an optical preform; and wherein said vessel and said tube are situated at such a distance downstream of the optical preform that the surface of the optical fiber is still pristine on entering said body.

* * * * *